Jan. 6, 1970 J. E. BRYDEN 3,488,551

MAGNETIC DEFLECTION AMPLIFIER WITH CIRCUIT ACCOMMODATING FOR THE BACK EMF

Filed Sept. 23, 1966

INVENTORS
JOSEPH E. BRYDEN

BY Carole M. Coleman

ATTORNEY

United States Patent Office 3,488,551

Patented Jan. 6, 1970

3,488,551

MAGNETIC DEFLECTION AMPLIFIER WITH CIRCUIT ACCOMMODATING FOR THE BACK EMF

Joseph E. Bryden, Framingham, Mass., assignor to Raytheon Company, Lexington, Mass., a corporation of Delaware Filed Sept. 23, 1966, Ser. No. 581,651
Int. Cl. H01j 29/70
U.S. Cl. 315—18 8 Claims

ABSTRACT OF THE DISCLOSURE

A magnetic deflection amplifier employing current feedback comprising a pre-amplifier, main amplifier, and output stage, said output stage including transistor switching circuits for supplying voltage during the transient condition which exceeds the back EMF voltage and for supplying reduced voltage during the longer steady state periods which is just adequate to meet the resistive drops of the circuit, deflection coil, and transistors. Thus high current is not drawn from high voltage supplies for long periods of time and a large amount of power is not dissipated in the output stage.

Figures 1, 2:
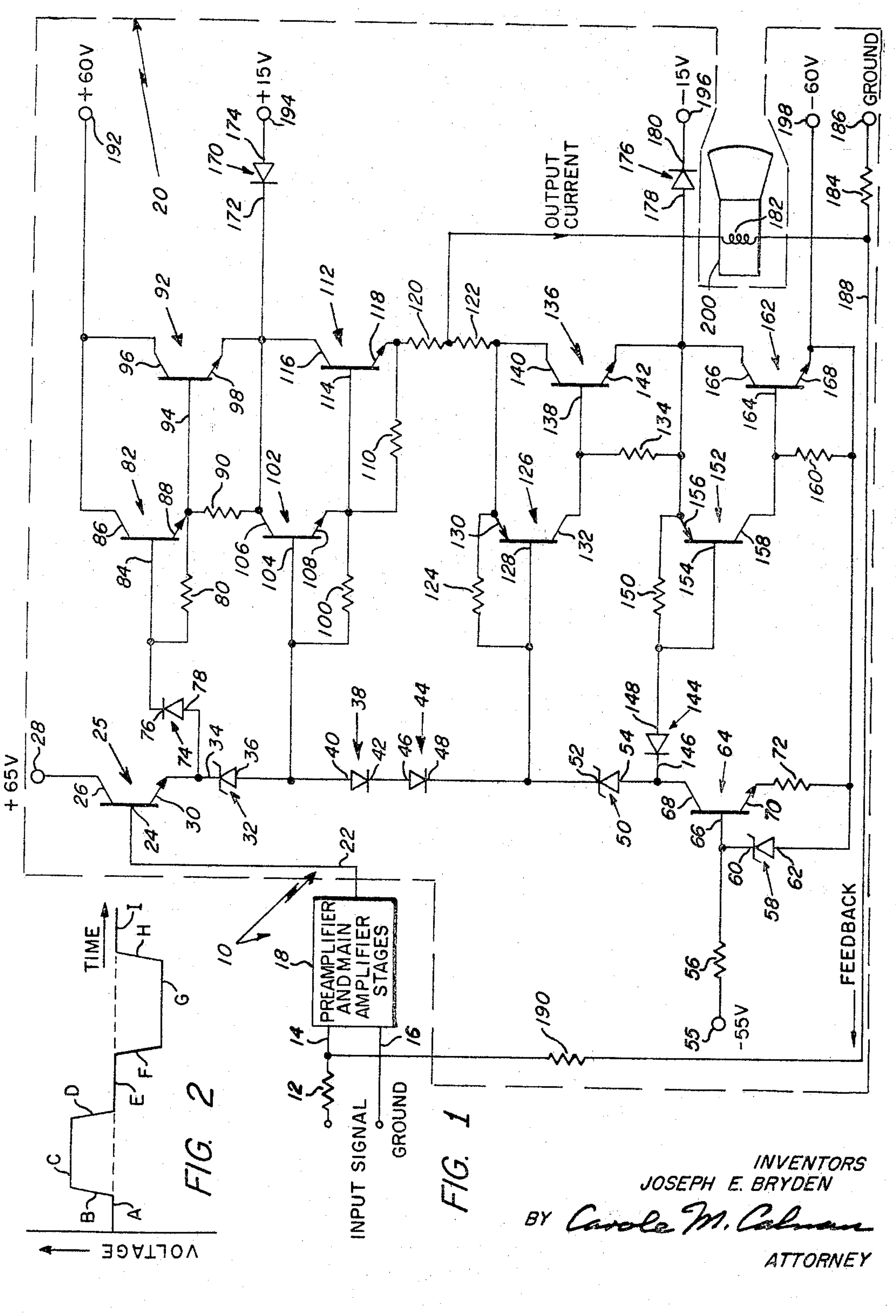

This invention is concerned with deflection amplifiers and, more particularly, with magnetic deflection amplifiers having power saving circuitry.

There are many reasons to prefer magnetic deflection of the beam over electrostatic deflection in a cathode ray tube display. For example, the magnetic field does not interfere with the beam-forming process, yielding brighter displays and clearer, more controllable spot sizes. In addition, power supply requirements such as ripple and regulation are less stringent. Also, the length of the tube is relatively small because larger deflection angles are possible without defocusing of the beam. This further simplifies the size and complexity of the electron gun.

In order to drive a deflection coil, the magnetic amplifier must be capable of accommodating the back EMF across the coil due to the product of the coil inductance, the rate of change of current through the coil, and the peak deflection current. Because of this, prior art amplifiers require a supply voltage which is equal to or greater than this back EMF. Hence, the output stage of the amplifier must dissipate power almost equal to the product of this back EMF and the peak deflection current when functioning with steady state peak deflection. These prior art amplifiers are quite impractical because the necessary high dissipation transistors do not meet the bandwidth requirements, and they are unrealistic in power demand and heating.

The present invention overcomes the problems of the prior art by adding a circuit to the output stage of the deflection amplifier which separates but utilizes both the transient and steady state operations. During selected transient conditions, this circuit allows power to be drawn from a supply which exceeds the back EMF voltage. However, during the longer steady state periods and other transient periods, this circuit applies a supply voltage to the deflection coil that is just adequate to meet the resistive drops of the deflection coil and transistors. Accordingly, it is not necessary to draw high currents from high voltage supplies for long periods of time and to continually dissipate a large amount of power in the output stage.

Other objects, features, and embodiments of the invention will become apparent from the following description of a preferred embodiment and reference to the accompanying drawings, wherein:

FIG. 1 is a schematic diagram of the invention for selectively driving a deflection coil of a cathode ray tube; and FIG. 2 is a diagram showing an input voltage waveform.

A preferred embodiment of the invention of the magnetic deflection amplifier 10 is shown in FIG. 1 and comprises preamplifier and main amplifier stages 18 and output stage 20 in the dotted block. Amplifier 10 is an operational amplifier having current feedback. Any well-known transistor circuits may be used to implement the preamplifier and main amplifier stages 18. For example, a series combination (not shown) may be employed comprising a first compensated common emitter amplifier stage with emitter feedback, a first emitter follower, a second common emitter amplifier stage with emitter feedback, a first common base amplifier stage, a third common emitter amplifier stage with emitter feedback, a third emitter follower, and a second common base amplifier stage. Such devices as a digital-to-analog converter or sweep generator may be used to provide the input signal of FIG. 2 for producing the desired display on cathode ray tube 200.

Output amplifier stage 20 includes an emitter follower 25 connected between the preamplifier and main amplifier stages 18 and a constant current source 64. A first cascaded emitter follower stage for high current gain comprises transistors 82 and 92 and is connected to the +60 volt source 192. Similarly, transistor emitter followers 102 and 112 are cascaded together for producing high current gain and moreover are connected to the +15 v. supply 194. Transistors 126 and 136 are connected in a super emitter follower configuration in order to achieve high current gain and are connected to the −15 volt source 196. In addition, transistors 152 and 162 are connected in a super emitter follower configuration and to −60 volt supply 198. Deflection coil 182 of cathode ray tube 200 is connected in common to resistors 120 and 122, and also to feedback line 188 and resistor 184.

Overall feedback in amplifier circuit 10 is obtained from the voltage across current sensing resistor 184 which is connected in series with deflection coil 182. The feedback current from feedback line 188 and the input signal current add in input line 14. Transistor 25 includes a chain of diodes 32, 38, 44, and 50 connected in series to its emitter 30. A substantially constant current is supplied to this diode chain and to base 84 of transistor 82, base 104 of transistor 102, base 128 of transistor 126, and base 154 of transistor 152 by transistor 64. The reference voltage applied to base 66 of transistor 64 is provided by Zener diode 58.

In the preferred embodiment of the invention, the range of signals applied to transistor 25 by stages 18 is centered about an offset voltage which has a value that causes the current through deflection coil 182 to equal zero. This offset voltage is determined by the base-to-emitter voltages of transistors 102, 112, and 126, Zener diode 32, and the normal operating point of transistor 25. However, it should be appreciated that alternative methods for obtaining the appropriate operating conditions for the transistors are possible.

Resistors 120 and 122 are included between deflection coil 182, and positively connected transistors 92 and 112, and negatively connected transistors 136 and 162, respectively, to minimize the risk of thermal run-away. Diodes 38 and 44 provide a potential difference to patrially offset the base-to-emitter voltages of transistors 102, 112, and 126, thus minimizing the "dead zone" in the output current when the input driving signal changes polarity. Resistors 80, 90, 100, 110, 124, 134, 150, and 160 provide a low impedance to remove the charge from the bases of the transistors in order to ensure rapid cut-off of emitter current.

Zener diodes 32 and 50 determine the voltage differences between base 104 of transistor 102 and base 154 of transistor 152. The Zener voltages are chosen to ensure that current is drawn through the outer sub-stages comprising transistors 82 and 92, and 152 and 162 from the 60 volt supplies 192 and 198 before the voltage drop across the emitter-collector of the inner sub-stages comprising transistors 102 and 112, and transistor 126 and 136 is reduced to a saturation level. This reduction in voltage is caused by the back EMF and voltage drops across deflection coil 182, resistor 184, and resistor 120 or 122. Diodes 74 and 144 disconnect transistor 82 and 152, respectively, from emitter follower transistor 25 when they are not conductive. These diodes 74 and 144 also keep the reverse base voltages applied to transistors 82 and 152 within safe limits.

The manner in which amplifier 10 operates to drive deflection coil 182 encircling cathode ray tube 200 will now be explained in detail. Initially, the input voltage waveform is at zero volts or A in FIG. 2, and during this time all of the transistors are nonconductive. Consequently, there is substantially no current in deflection coil 182 of cathode ray tube 200.

When the input signal rises, as shown by line B, amplifier 10 operates in a transient condition. Base electrode 128 of transistor 126 and base electrode 154 of transistor 152 go rapidly negative. At first, both transistor 126 and transistor 136 start conducting. Later, transistors 152 and 162 begin to conduct when collector 68 of transistor 64 goes sufficient negative for diode 144 to conduct. At this time, diode 176 is back-biased, thus separating —15 volt source 196 from transistor 136 and deflection coil 182. Hence, during this transient operation of amplifier 10, the —60 volt source 198 is connected through conducting transistors 162 and 136 and resistor 122 to deflection coil 182 of cathode ray tube 200. The change in current through deflection coil 182 during this transient condition is proportional to —60 volts divided by the inductance of coil 182. Accordingly, the high voltage source 198 is used to drive deflection coil 182 for this transient operation of amplifier 10.

When the input voltage reaches the constant or steady state condition, designated as C, transistors 152 and 162 become nonconductive. However, transistors 126 and 136 continue to conduct. Since diode 176 is no longer back-biased, —15 volt source 196 is connected through forward-biased diode 176, conducting transistor 136, resistor 122 to deflection coil 182 of cathode ray tube 200. In this manner, the low voltage source 196 drives deflection coil 182 during the comparatively long steady state operation of amplifier 10.

The next input signal transient D now begins in order to reduce the current in deflection coil 182 to zero. The inductance of coil 182 tends to maintain its current in the same direction, and a back EMF will be induced which causes transistors 126 and 136 that were conducting during the steady state operation to remain conducting until all of the energy in deflection coil 182 has been removed. Hence, the back EMF across deflection coil 182 is applied to collector 140 of transistor 136 via resistor 122. In addition, −15 volt source 196 is connected through conducting diode 176 to emitter 142 of transistor 136. Consequently, transistor 136 dissipates the energy from deflection coil 182 until the deflection coil current reaches zero. It should be noted that a high voltage, i.e. the sum of the back EMF and 15 volts, is placed across transistor 136 during this transient period even though that transistor is connected to the smaller voltage source.

When the input voltage reaches the zero volt condition labelled E, all of the transistors are nonconductive. Therefore, at this time there is substantially no current in deflection coil 182 of cathode ray tube 200.

As the input signal further decreases along line F, amplifier 10 again operates in a transient condition. Base electrode 84 of transistor 82 and base electrode 104 of transistor 102 are caused to rapidly rise in a positive direction. Accordingly, transistors 102 and 112 begin to conduct. Thereafter, when the voltage at emitter 30 of transistor 25 reaches approximately +16 volts, transistors 82 and 92 start conducting. Diode 170 is now back-biased and, therefore, separates +15 volt source 194 from deflection coil 182 of cathode ray tube 200. Consequently, when amplifier 10 functions in this transient condition, +60 volt source 192 is connected through conducting transistors 92 and 112 and resistor 120 to deflection coil 182 of cathode ray tube 200. The current change in deflection coil 182 during this transient operation is proportional to +60 volts divided by the inductance of coil 182. Hence the high voltage source 192 is utilized to drive deflection coil 182 during this transient operation of amplifier 10.

The input voltage signal then reaches the constant or steady state condition shown as G, and transistors 82 and 92 stop conducting. Transistors 102 and 112, however, continue to conduct, and diode 170 now becomes forward-biased. Hence, +15 volt supply 194 is connected through forward-biased diode 170, conducting transistor 112, resistor 120, to deflection coil 182 of cathode ray tub 200. Accordingly, the low voltage source 194 drives deflection coil 182 during the comparatively long steady state operation of amplifier 10.

In order to reduce the current in deflection coil 182 to zero, the next input signal transient shown as H begins. Transistors 82 and 92 remain nonconducting, while transistors 102 and 112 continue to conduct. The back EMF across deflection coil 182 builds up rapidly and is applied to emitter 118 of transistor 112 via resistor 120. Moreover, +15 volt source 194 is connected through forward-biased diode 170 to collector 116 of transistor 112. Consequently, transistor 112 dissipates the energy from deflection coil 182 until the deflection coil current reaches zero. Accordingly, the smaller voltage source 194 is used during this transient period.

The input voltage is now at zero volts which is designated as I, and all of the transistors are nonconductive. Therefore, there is substantially no current flow in deflection coil 182 of cathode ray tube 200 at this time.

In summation, this invention comprises an amplifier for driving a deflection coil associated with a cathode ray tube which is capable of separating the transient and steady state operations. During those transient conditions when energy is being loaded into the deflection coil, the circuit draws power from a supply that exceeds the back EMF voltage. However, during the steady state periods and those transient periods when energy is taken from the deflection coil, this circuit applies a supply voltage to the deflection coil which is just sufficient to meet the resistance drops of the deflection coil and transistors. Consequently, with this invention it is not necessary to draw high currents from high voltage supplies for long periods of time, and thus it is not necessary to continually dissipate a large amount of power in the output stage.

It should be appreciated that this invention is not limited to the foregoing description of a preferred embodiment. For instance, other type amplifiers may be used instead of the feedback type described, and many other types of inductances such as a magnetic focusing coil for a cathode ray tube could be driven by the invention. Also, external instructions could be used to selectively switch the supplies during transient and steady state operations, and it is possible to connect the deflection coil to a third source for intermediate transients. Accordingly, this invention is limited only by the following claims.

What is claimed is:

1. A circuit for driving an inductance element to perform transient and steady state operations, said circuit comprising:

means coupled to said inductance element to allow said element to draw current from one supply voltage during steady state and transient periods when energy is taken from the element; and means coupled to said element to allow said element to draw current from another supply voltage having a larger value than said one supply voltage during transient periods when energy is being loaded into the element.

2. The invention according to claim 1 and wherein:

said means each comprise first and second cascaded emitter followers.

3. The invention according to claim 1 wherein:

said element is a magnetic deflection coil.

4. A circuit for driving magnetic deflection means in a display device which performs transient and steady state operations, comprising:

a first source of voltage;

a second source of voltage having a value substantially larger than said first voltage;

a first switch coupled to said second source of voltage;

a second switch coupled to said first switch, said first source of voltage, and said deflection means;

said first and second switches being operative to allow said deflection means to draw current from said second source of voltage which exceeds the back EMF voltage of the circuit during transient periods when energy is being loaded into said deflection means, and said second switch only being operative to allow said deflection means to draw current from said first source of voltage which is sufficient to prevent saturation of said second switch as required and to exceed the voltage drop due to the current flowing through the circuit including the deflection means during steady state and transient periods respectively when energy is taken from said deflection means.

5. The invention according to claim 4 and wherein:

diode means are coupled between said second switch and said first source of voltage for preventing current from being drawn by said deflection means from said first voltage when said circuit performs a transient operation during which energy is being loaded into said deflection means.

6. The invention according to claim 4 and wherein:

said first switch comprises first and second emitter followers cascaded together; and said second switch comprises third and fourth emitter followers cascaded together.

7. The invention according to claim 4 and wherein:

said first switch comprises first and second emitter followers cascaded together;

said second switch comprises third and fourth emitter followers cascaded together;

a source of constant current is coupled to said first and second switches;

diode means are coupled between said second switch and said first source of voltage for preventing current from being drawn by said deflection means from said first voltage when said circuit performs a transient operation during which energy is being loaded into said deflection means.

8. A magnetic deflection amplifier for driving a magnetic deflection coil of a cathode ray tube which performs transient and steady state operations, said amplifier comprising:

preamplifying and amplifying means for amplifying the input signal to the amplifier; and an output stage connected to the preamplifying and amplifying means;

said output stage comprising a first source of supply voltage;

a second source of supply voltage having a value substantially larger than said first voltage;

a first switch comprising first and second emitter followers cascaded together, said first switch being coupled to said second voltage;

a second switch comprising third and fourth emitter followers cascaded together, said second switch being coupled to said first switch, said first voltage and said deflection coil;

a source of constant current coupled to said first and second switches;

said first and second switches being operative to allow said deflection coil to draw current from said second source of supply voltage which exceeds the back EMF voltage of the coil during transient periods when energy is being loaded into said coil;

said second switch only being operative to allow said deflection coil to draw current from said first source of supply voltage which is sufficient to prevent saturation of said second switch as required and to exceed the voltage drop due to the current flowing through the circuit including the deflection coil during steady state and transient periods respectively when energy is taken from said coil; and diode means coupled between said second switch and said first source of supply voltage for preventing current from being drawn by said deflection coil from said first source of supply voltage when said amplified performs a transient operation during which energy is being loaded into said coil.

References Cited

UNITED STATES PATENTS

| | | | |
|---|---|---|---|
| 3,299,424 | 1/1967 | Vinding | 343—6.5 |
| 3,378,720 | 4/1968 | Duerr et al. | 315—27 |

RODNEY D. BENNETT, Jr., Primary Examiner

JOSEPH G. BAXTER, Assistant Examiner

U.S. Cl. X.R.

315—26, 27